Patented June 6, 1950

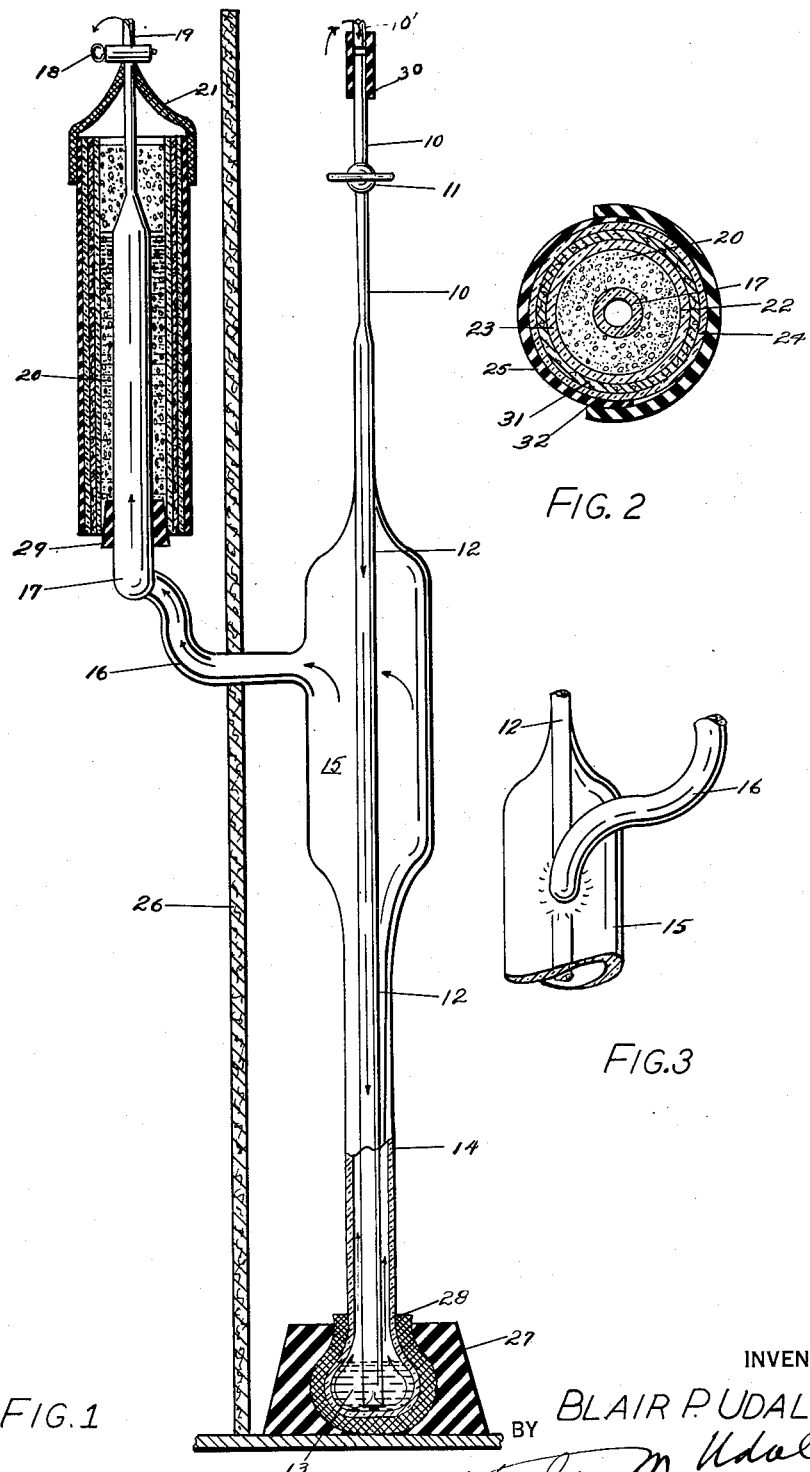

2,510,533

UNITED STATES PATENT OFFICE 2,510,533

APPARATUS FOR GAS ANALYSIS

Blair Paxton Udale, Detroit, Mich.

Original application May 15, 1945, Serial No. 593,819. Divided and this application April 19, 1946, Serial No. 663,298

1 Claim. (Cl. 73—29)

The object of this invention is to measure the weight of liquid carried as vapor in a stream of gas, preferably air. The liquid may be water and alcohol, or any other two miscible liquids. By means of an immersion refractometer with an auxiliary prism, I can complete the analysis by getting the percentage of alcohol and of water in the trapped liquid. This application is a division of my copending application Serial No. 593,819 filed May 15, 1945.

Fig. 1 shows the preferred form of my invention.

Fig. 2 is a cross-sectional plan view through the Dry Ice jacket.

Fig. 3 is a partial side view.

Located at the upper end of a glass tube 10 is mounted a stopcock 11. This entrance tube 10 is continued down as tube 12, which passes through an expansion chamber 15. The tube 12 terminates in a small chamber 13. 14 is the outside tube forming the outlet from the upper portion of chamber 13 and the jacket for the tube 12. Tube 14 terminates in the enlarged chamber 15. 16 is the horizontal gooseneck exit tube leading to the vertical tube 17 in the upper end of which is the stopcock 18 and outlet tube 19. Cloth 28 and rubber support 27 protect the chamber 13. A partition 26 protects the jacket 20 and delays the evaporation of the Dry Ice contained in the jacket.

In Fig. 2, 22 and 23 are the half-cylindrical, glass walls of the jacket. 24 and 25 are the rubber tubes split endways and stretched so that the portion marked 24 embraces the portion marked 25, and the joint action of these two split rubber tubes 24 and 25 is to hold the glass jacket 22—23 together, so as to retain the Dry Ice in place. 31 is a layer of asbestos next to the glass 22—23. 32 is a layer of paraffin outside the asbestos layer 31. A cloth cone 21, Fig. 1, is used to cover the top of the Dry Ice container to limit the rate of evaporation of Dry Ice. 29 is a split, removable rubber stopper embracing the tube 17.

Operation

First, the apparatus is thoroughly dried by drawing dry air through the reflux column to eliminate the last trace of moisture, a flame is gently passed over the outside during the final passage of the dry air through the apparatus. Before weighing, the glycerine lubricant is removed from the surface of the glass inlet and outlet up to the stopcocks. Absolute cleanliness is required and the apparatus is allowed to come to equilibrium with the atmospheric temperature before weighing. Counterweights of the same material are used in the process of weighing to an accuracy of $\pm \frac{2}{10}$ of 1 milligram. 1½ c. c. of water are delivered into the absorber bulb 13 at the end of the reflux column 14 by means of a microfunnel and a graduated micropipette. The increase in weight gives the weight of the water added.

The gas absorber is connected at 10 (by means of a rubber connection 30) to the supply of vapor to be analyzed through a pipe 10'. (The microstopcocks were previously lubricated with a mixture of 6B graphite and vacuum grease, which is practically chemically inactive to water or methyl alcohol. The 6B graphite is applied to the surface of the bore by rubbing from a graphite stick and the vacuum grease is then applied in dabs and warmed gently. The bore is pressed in place and allowed to cool before rotating.) Powdered Dry Ice is added to the Dry Ice jacket 20, and for five minutes is allowed to gradually cool the glass. (Dry Ice, solid $CO_2$ at $-56°$ C. approximately.) Then, a mixture of Dry Ice and methyl alcohol is added and tapped down with the aid of the flattened end of a thick copper wire. (Temperature equals $-72°$ C.) A cover of Dry Ice is then added, the top of which is covered with a cloth 21, to cut down evaporation of the Dry Ice. The cooling mixture is periodically added to the Dry Ice jacket, until ice has formed on the outside of the rubber outer wall 24, 25 Fig. 2. This indicates that the glass outlet 17 and the Dry Ice jacket 20 are at their minimum temperature. After this, the jacket will require watching every 15 minutes to 30 minutes, depending upon the temperature and humidity of the laboratory. The inlet and outlet stopcocks 11 and 18 are then opened and the vapor to be analyzed is allowed to flow through the gas absorber at a measured rate, indicated by a flowmeter in series with the source of the vapor stream and the gas absorber. A stopwatch is used to time the flow so that the exact volume of vapor passing through the gas absorber can be calculated. At the termination of the run, the inlet stopcock 11 is closed, followed by the closing of the outlet stopcock 18. The Dry Ice jacket 20 is then removed and the outlet tube 17 wiped free of condensed moisture on the outside. The gas absorber is then disconnected from the gas inlet 10'. The stopcocks 11 and 18 are first opened and then closed to equalize pressure. The inlet 10 is freed from any glycerine by wiping with the cleaning solution. The inlet and outlet are swabbed with pipe cleaners to remove any dust particles or cleaning fluid. When the gas absorber rises to room temperature, it is then prepared for weighing and weighed to a ±0.2 mg. The increase in weight represents the total weight of vapors absorbed by the absorbing liquid, water in this case, in the given volume of gas passed through the gas absorber.

Analyzing the solution in the bulb of gas absorber:

For the analysis of the percentage composition of methyl alcohol caught in the bulb 13 of the gas absorber, a reference curve is previously constructed under laboratory conditions.

For the methyl alcohol water system, the immersion prism A ($n=1.32539$ to $1.36640$) and the auxiliary prism No. 3 for use with the immersion prisms A and B of the dipping or immersion refractometer were used. The instrument was checked against a distilled water blank. Due to the sensitivity of the index of refraction to temperature changes, when using only small quantities, it is advisable to use a good constant temperature bath in place of the water trough which comes with the instrument. A water constant temperature bath is used and kept at the temperature of 25° C.±0.02° C.

For the percentage of methyl alcohol against dipping refractometer readings at 25° C., the straight portion of the curve falls between 1.5% and 30% by weight of methyl alcohol in an aqueous solution. The volume of the absorbing liquid in the gas absorber was chosen so that the resultant percent composition of the solution lay on this portion of the curve (½ to 1½ c. c. of water is used).

After the blank (distilled water) has been run, both stopcocks 11 and 18 of the gas absorber are opened. The liquid in the bulb 13 is shaken down into the expansion chamber 15 (a slight pressure on the inlet 10 may be necessary), and the stopcocks 11 and 18 are then closed.

The liquid is rotated in the expansion chamber 15 to accomplish mixing and then shaken into outlet tube 16—17. Then both stopcocks 11—18 are carefully opened.

The first drop of liquid which passes the outlet stopcock 18 is discarded and the second drop is poured onto the horizontal surface of the auxiliary prism, which is immediately transferred to the A prism of the dipping refractometer and screwed into place. The stopcocks 11 and 18 of the gas absorber are then closed. The reading of the dipping refractometer is recorded only after a sharp line of demarcation has been obtained and reading remains constant for at least 5 minutes. This indicates equilibrium has been reached. The prisms are then cleaned with distilled water and a lint-free cloth and a second sample is taken and recorded, making sure that the first drop emerging from the gas absorber is always discarded, as it carries with it any contamination in the exit of the outlet tube. The reading is referred to the percent methyl alcohol reference curve. The percentage composition of the total weight of the solution (water added plus increase in weight) gives directly the weight of methyl alcohol in the volume of gas passed through the gas absorber.

The accuracy between successive samples from the same solution was found to be between ±0.03 to ±0.04 scale divisions. On the straight portion of the reference curve (1.5% to 30% methyl alcohol), a ±0.1 scale division gave ±0.13% by weight of methyl alcohol and ±0.2 scale division gave ±0.3% by weight of methyl alcohol.

*Gas absorber*

An accuracy of ±0.2 scale divisions can easily be obtained, counting in all experimental errors, to a ±0.1 scale division. Accuracy can be obtained with good control of temperature and other laboratory conditions (such as weighing and care of Dry Ice jacket and handling of dipping refractometer).

The efficiency of the Dry Ice jacket was checked by passing Dry Air at 212 cc./min. through the gas absorber containing 1.8 grams of water. A change in weight of ±0.2 mg. to ±0.4 mg. was obtained.

The temperature of Dry Ice is −56° C. and the mixture of Dry Ice and methyl alcohol is −72° C. The freezing point of water is 0° C. and that of a 71.9% by weight of methyl alcohol and water is −51.3° C. The temperature of the Dry Ice jacket is adequate. Since the critical temperature of Dry Ice is +31° C., the Dry Ice jacket would not be practical at room temperature at or above 31° C. as the Dry Ice would evaporate too fast. A different cooling mixture would have to be used at higher temperatures.

*Gas absorber limitations*

The gas must contain only two miscible vapors, as any other would act as a contaminant in determining the index of refraction of the resultant solution in the gas absorber. All other water soluble and condensible vapors (−56° C. or −72° C.) must be removed previously.

The flow and pressure of the vapor stream must be such that the absorbing liquid in the bulb of the gas absorber just refluxes in the reflux column and is not mechanically splattered too far into the expansion chamber 15. If too great a pressure is used, the liquid might be mechanically forced into the exit tube 16—17, thereby clogging it and allowing vapor to escape through the exit tube 19.

A slow stream of vapor gives the best results. It allows time for contact between vapor and absorbing liquid, so that complete absorption of vapors can take place. It allows sufficient time of contact of the vapors in the exit tube with the cold temperature (−56° C. to −72° C.) so that condensation of the vapors can take place. (212 cc./min. flow of vapors at a pressure of 950 m. m. of mercury and a ½ to 1½ cc. volume of absorbing liquid was used.)

The stream of air and vapor descending in tube 12 reverses in the trap 13 and ascends in tube 14, meeting a descending stream of cold condensed water and alcohol. An interchange of heat takes place. The air gets colder, the liquid gets warmer. In the expansion chamber 15, the velocity slows down and the temperature drops and any liquid carried up by the air refluxes, that is, it descends. This is the principle of a reflux column. The cold jacket 20 surrounding the exit tube 17 prevents anything except dry air escaping to the atmosphere through the outlet 19.

What I claim is:

The method of analysis of the vapor contents of a moving stream of gas containing no more than two miscible liquids, one of which is water as vapor comprising the steps; passing the stream of gas into a liquid vapor trap at the bottom of a reflux column; drawing the gas through the trap and in heat exchange relationship with the incoming gas and at the same time expanding the gas; drawing the expanded gas through a cooled passage to cause condensation of remaining vapors and consequential reflux action with the incoming gases; weighing the vapor trap liquid after a predetermined flow of gas to determine the total vapor content; analyzing the trap liquid for relative percentages of the two miscible liquids.

BLAIR PAXTON UDALE.

REFERENCES CITED

The following references are of record in the file of this patent:

UNITED STATES PATENTS

| Number | Name | Date |
|---|---|---|
| 1,845,247 | Davidson | Feb. 16, 1932 |
| 2,065,114 | Cahn et al. | Dec. 22, 1936 |
| 2,269,569 | Williams | Jan. 13, 1942 |
| 2,314,201 | Elsey | Mar. 16, 1943 |